US012764705B2

(12) United States Patent
Hoang et al.

(10) Patent No.: US 12,764,705 B2
(45) Date of Patent: Oct. 13, 2026

(54) METHODS AND SYSTEMS FOR POSITIONING GROUP MONITORING AND MAINTENANCE

(71) Applicant: InterDigital Patent Holdings, Inc., Wilmington, DE (US)

(72) Inventors: Tuong Hoang, Montreal (CA); Fumihiro Hasegawa, Westmount (CA); Tao Deng, Roslyn, NY (US); Paul Marinier, Brossard (CA); Moon IL Lee, Melville, NY (US); Jaya Rao, Montreal (CA); Kunjan Shah, London (GB)

(73) Assignee: InterDigital Patent Holdings, Inc., Wilmington, DE (US)

(*) Notice: Subject to any disclaimer, the term of this patent is extended or adjusted under 35 U.S.C. 154(b) by 307 days.

(21) Appl. No.: 18/499,630

(22) Filed: Nov. 1, 2023

(65) Prior Publication Data

US 2024/0147410 A1 May 2, 2024

Related U.S. Application Data

(60) Provisional application No. 63/421,850, filed on Nov. 2, 2022.

(51) Int. Cl.
*H04W 64/00* (2009.01)
*H04B 17/318* (2015.01)

(52) U.S. Cl.
CPC .......... *H04W 64/00* (2013.01); *H04B 17/328* (2023.05)

(58) Field of Classification Search
CPC .............................. H04W 64/00; H04W 24/10
See application file for complete search history.

(56) References Cited

U.S. PATENT DOCUMENTS

| | | | | |
|---|---|---|---|---|
| 2023/0091628 A1* | 3/2023 | Nam | H04W 72/1263 | 370/329 |
| 2023/0319776 A1* | 10/2023 | Edge | H04W 64/006 | 455/456.1 |
| 2025/0234329 A1* | 7/2025 | Hu | H04L 5/005 | |

FOREIGN PATENT DOCUMENTS

| | | | |
|---|---|---|---|
| WO | 2022212533 | A1 | 10/2022 |
| WO | 2023154782 | A1 | 8/2023 |
| WO | 2023211905 | A1 | 11/2023 |

* cited by examiner

*Primary Examiner* — Michael T Vu
(74) *Attorney, Agent, or Firm* — Flaster Greenberg, P.C.

(57) ABSTRACT

A target wireless transmit/receive unit (WTRU) may determine a signal quality of a received sidelink positioning reference signal (SL-PRS) from each anchor WTRU of a sidelink positioning group. The target WTRU may determine whether the sidelink positioning group is suitable for sidelink positioning, for example based on whether a number of anchor WTRUs of the sidelink positioning group that are suitable for sidelink positioning exceeds a threshold value. The target WTRU may determine a position of the target WTRU, for example using the sidelink positioning group based on the number of anchor WTRUs of the sidelink positioning group that are suitable for sidelink positioning exceeding the threshold value.

20 Claims, 6 Drawing Sheets

METHODS AND SYSTEMS FOR POSITIONING GROUP MONITORING AND MAINTENANCE

CROSS REFERENCE TO RELATED APPLICATIONS

This application claims the benefit of U.S. Provisional Patent Application No. 63/421,850 filed on Nov. 2, 2022, the entire contents of which are incorporated herein by reference.

BACKGROUND

Mobile communications using wireless communication continue to evolve. More specifically, sidelink communications between devices continues to evolve.

In NR V2X, the resource for sidelink transmission/reception may be structured as resource pools. The resource pool may consist of a set of continuous frequency resources repeating in time following a bitmap pattern. A wireless transmit/receive unit (WTRU) may be configured one or multiple resource pool. For in coverage WTRUs, the resource pool can be configured via SIB/RRC. For out of coverage WTRUs, the resource pool can be configured.

SUMMARY

Systems and methods are disclosed for positioning group monitoring and maintenance. For example, a WTRU may perform link-based sidelink position monitoring. A WTRU may determine which of one or more WTRU performs link-based sidelink position monitoring. In some examples, a determined WTRU may include the WTRU that makes the determination.

A WTRU may determine whether or not to initiate a sidelink positioning monitoring procedure. In some embodiments, a WTRU may determine the suitability of a link for sidelink positioning. A WTRU may base the suitability on a received sidelink—positioning reference signal (SL-PRS). In other embodiments, the WTRU may base the suitability of the link for sidelink positioning on a receiving sidelink transmission. The suitability may be based on measurement reporting in some embodiments.

The WTRU can evaluate a link based on one or more link quality metrics. The one or more link quality metrics may be selected for link-based sidelink position monitoring. Additionally, or alternatively, the WTRU may determine a time to evaluate the suitability of a link. In some embodiments, the WTRU can trigger one or more sidelink transmissions. The one or more sidelink transmissions can be for sidelink positioning monitoring.

In some examples, the WTRU may determine whether or not to formulate a positioning group. Additionally or alternatively, the WTRU may determine whether to monitor a link in a group. The link may be associated with another WTRU. In some embodiments, the WTRU may determine whether one or more positioning group is suitable or is unsuitable for sidelink positioning. The WTRU may determine a time to evaluate the suitability of the one or more positioning group. The WTRU may determine that a link is LPSUP (Link-Persistently Unusable for Sidelink Positioning). Additionally, or alternatively, the WTRU may trigger a LPUSP timer. In some embodiments, the WTRU may determine that a group is Group-Persistently Unusable for Sidelink Positioning (GPUSP). Additionally, or alternatively, the WTRU may trigger a GPUSP timer. In some embodiments, the WTRU may receive an indication from a node for sidelink positioning monitoring. The WTRU may select one or more additional or alternative WTRUs for one or more positioning session.

A WTRU may include a processor and a memory. The processor and the memory may be configured to establish a connection with an anchor WTRU for sidelink link-based positioning. The processor and memory may be configured to receive an indication of a positioning method type, determine a link quality metric for the connection between the WTRU and the anchor WTRU based on the positioning method type, determine the suitability of the anchor WTRU for sidelink link-based positioning based on the link quality metric, and determine a position of the WTRU using the anchor WTRU for sidelink link-based positioning.

A link quality metric may comprise both a Sidelink Positioning Reference Signal (SL-PRS) reception and a SL-PRS measurement report when the positioning method type is Round Trip Time (RTT)-based. A link quality metric may comprise SL-PRS reception when the positioning method type is Sidelink Positioning Reference Signal Reception (SL-PRS Rx)-based. A link quality metric may comprise the SL-PRS measurement report when the positioning method type is Sidelink Positioning Reference Signal Transmission (SL-PRS Tx)-based.

In some embodiments, when a positioning method type is RTT-based, one or more of the memory and processor may be configured to perform one or more of transmitting a sidelink positioning reference signal to the anchor WTRU, receiving a sidelink positioning reference signal from the anchor WTRU, and receiving a SL-PRS measurement report from the anchor WTRU based on the sidelink positioning reference signal transmitted to the anchor WTRU. The link quality metric may comprise, for example, the SL-PRS received from the anchor WTRU and the SL-PRS measurement report.

In some embodiments, when a positioning method type is SL-PRS Rx-based, the WTRU may be configured to receive a sidelink positioning reference signal from the anchor WTRU. The link quality metric may comprise, for example, the SL-PRS received from the anchor WTRU.

The WTRU may also, for example, be configured to establish a connection with a second anchor WTRU for sidelink link-based positioning, determine a second link quality metric for the connection between the WTRU and the second anchor WTRU based on the positioning method type, determine the suitability of the second anchor WTRU for sidelink link-based positioning based on the second link quality metric and determine a position of the WTRU using the second anchor WTRU for sidelink link-based positioning. In some embodiments, the suitability of the anchor WTRU and the second anchor WTRU for sidelink link-based positioning may be independently determined.

In some embodiments, the WTRU may be configured to receive the positioning reference signal during an evaluation period. The suitability of the anchor WTRU for sidelink link-based positioning may be, for example, determined during the evaluation period. In some embodiments, the WTRU may be configured to determine whether a value of unsuitable indications exceeds an unsuitability threshold. Based on the value of unsuitable indications exceeding an unsuitability threshold, the WTRU may, for example, perform one or more of sending a Link-Persistently Unusable for Sidelink Positioning (LPUSP) indication to one or more nodes, releasing one or more links, and stopping a sidelink positioning session.

A target wireless transmit/receive unit (WTRU) may receive a first sidelink positioning reference signal (SL-PRS) from an anchor WTRU. The target WTRU may determine a signal quality of the first SL-PRS. The target WTRU may transmit a second SL-PRS to the anchor WTRU. The target WTRU may receive a SL-PRS measurement report from the anchor WTRU. The SL-PRS measurement report may be based on the second SL-PRS transmitted to the anchor WTRU. The target WTRU may determine that the anchor WTRU is suitable for sidelink link-based positioning, for example based on the signal quality of the first SL-PRS and/or the SL-PRS measurement report received from the anchor WTRU. The target WTRU may determine a position of the target WTRU using the anchor WTRU.

The target WTRU may determine that the anchor WTRU is suitable for sidelink link-based positioning, for example when the signal quality of the first SL-PRS is greater than a first threshold and/or the SL-PRS measurement report indicates that a signal quality of the second SL-PRS transmitted to the anchor WTRU is greater than a second threshold. The first threshold and/or the second threshold may be in a configured and/or predetermined range. The target WTRU may determine that the anchor WTRU is unsuitable for link-based positioning, for example when the signal quality of the first SL-PRS is less than a first threshold, the SL-PRS measurement report indicates that a signal quality of the second SL-PRS transmitted to the anchor WTRU is less than a second threshold, the second SL-PRS is not transmitted to the anchor WTRU, the first SL-PRS from anchor WTRU is not received, and/or the SL-PRS measurement report is not received.

The target WTRU may determine that the anchor WTRU is unsuitable for link-based positioning for a number of consecutive periods. The target WTRU may transmit a link persistently unusable for sidelink positioning (LPUSP) indication, for example based on the number of consecutive periods exceeding a third threshold. The target WTRU may stop a sidelink positioning session with the anchor WTRU. A (e.g., each) period of the number of consecutive periods may include receiving the first SL-PRS, transmitting the second SL-PRS, and/or receiving the SL-PRS measurement report. The LPUSP may be transmitted to one or more of the anchor WTRU and/or a location management function (LMF). The signal quality of the first SL-PRS may include one or more of a line of sight (LOS) value and/or a non-line of sight (NLOS) value. The target WTRU may receive an indication to perform sidelink positioning monitoring. The target WTRU may transmit an indication to perform sidelink positioning monitoring to another WTRU.

The target WTRU may receive a SL-PRS measurement report from each anchor WTRU in the sidelink positioning group. The SL-PRS measurement report may be based on the SL-PRS transmitted to each anchor WTRU in the sidelink positioning group. The measurement report may include an indication of one or more of a distance between the WTRU and the respective anchor WTRU and/or a direction between the WTRU and the respective anchor WTRU. The target WTRU may determine whether to maintain or terminate the sidelink positioning group, for example if an anchor WTRU moves out of the sidelink positing group.

The target WTRU may determine a signal quality of a received SL-PRS from each anchor WTRU of the sidelink positioning group. The target WTRU may transmit a SL-PRS to each anchor WTRU of the sidelink positioning group. The target WTRU may receive a SL-PRS measurement report from each anchor WTRU of the sidelink positioning group, for example based on the SL-PRS transmitted to the anchor WTRU. The target WTRU may determine whether each of the anchor WTRUs of the sidelink positioning group are suitable for sidelink positioning. The determination may be based on the signal quality of the SL-PRS received from the respective anchor WTRU and/or the SL-PRS measurement report received from the anchor respective WTRU.

The target WTRU may determine whether the sidelink positioning group is suitable for sidelink positioning, for example based on whether a number of anchor WTRUs of the sidelink positioning group that are suitable for sidelink positioning exceeds a threshold value. The target WTRU may determine a position of the target WTRU, for example using the sidelink positioning group based on the number of anchor WTRUs of the sidelink positioning group that are suitable for sidelink positioning exceeding the threshold value. The target WTRU may determine that the sidelink positioning group is unsuitable for a number of consecutive periods. The target WTRU may send a Group-Persistently Unusable for Sidelink Positioning (GPUSP) indication to one or more devices. The GPUSP indication may be sent, for example by the target WTRU, to a network device and/or an anchor WTRU of the sidelink positioning group. The signal quality may include sidelink receive signal receive power (SL-RSRP).

BRIEF DESCRIPTION OF THE DRAWINGS

FIG. 10 is a system diagram illustrating an example radio access network (RAN) and an example core network (CN) that may be used within the communications system illustrated in FIG. 1A according to an embodiment.

DETAILED DESCRIPTION

Figure 1A:
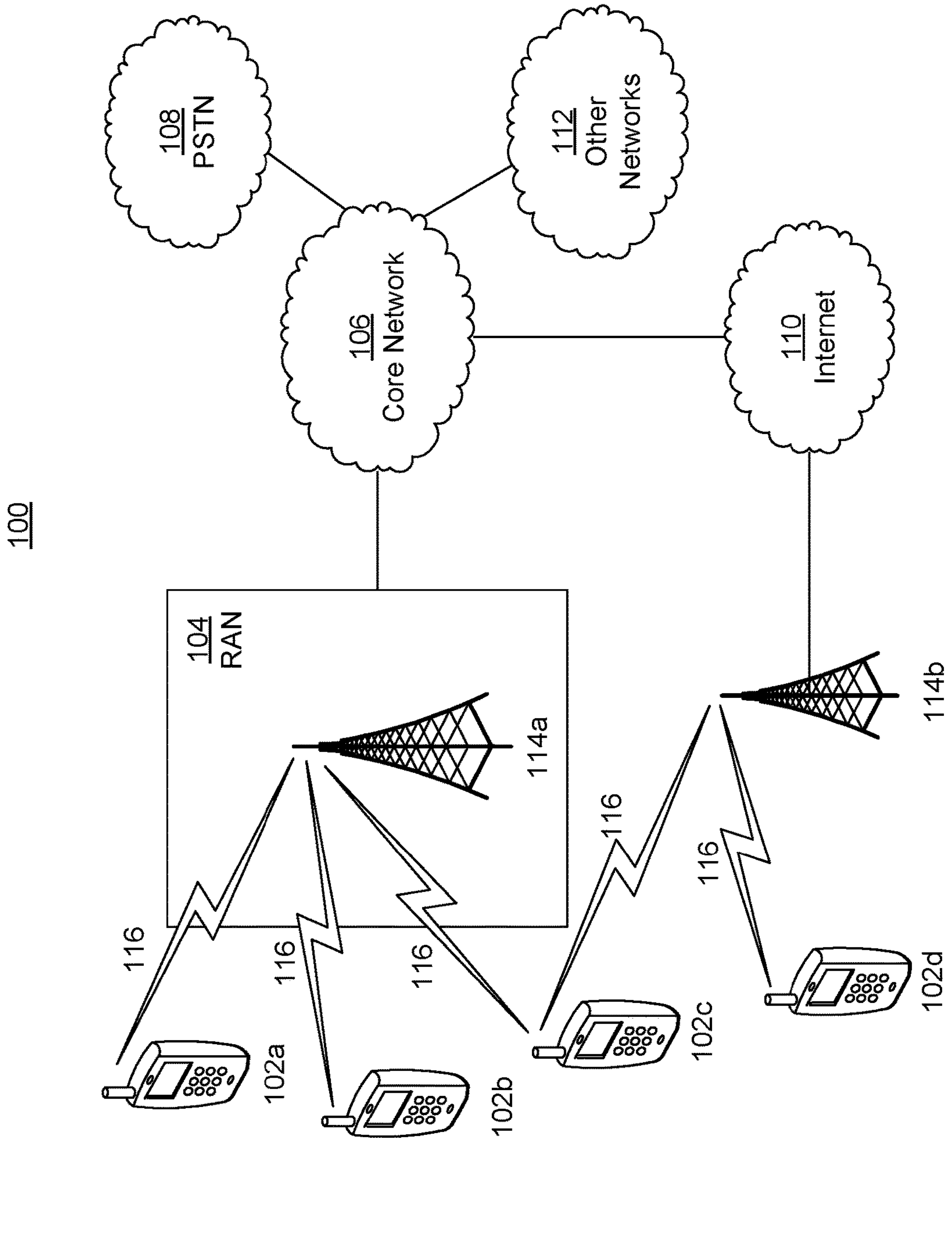
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (M IMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
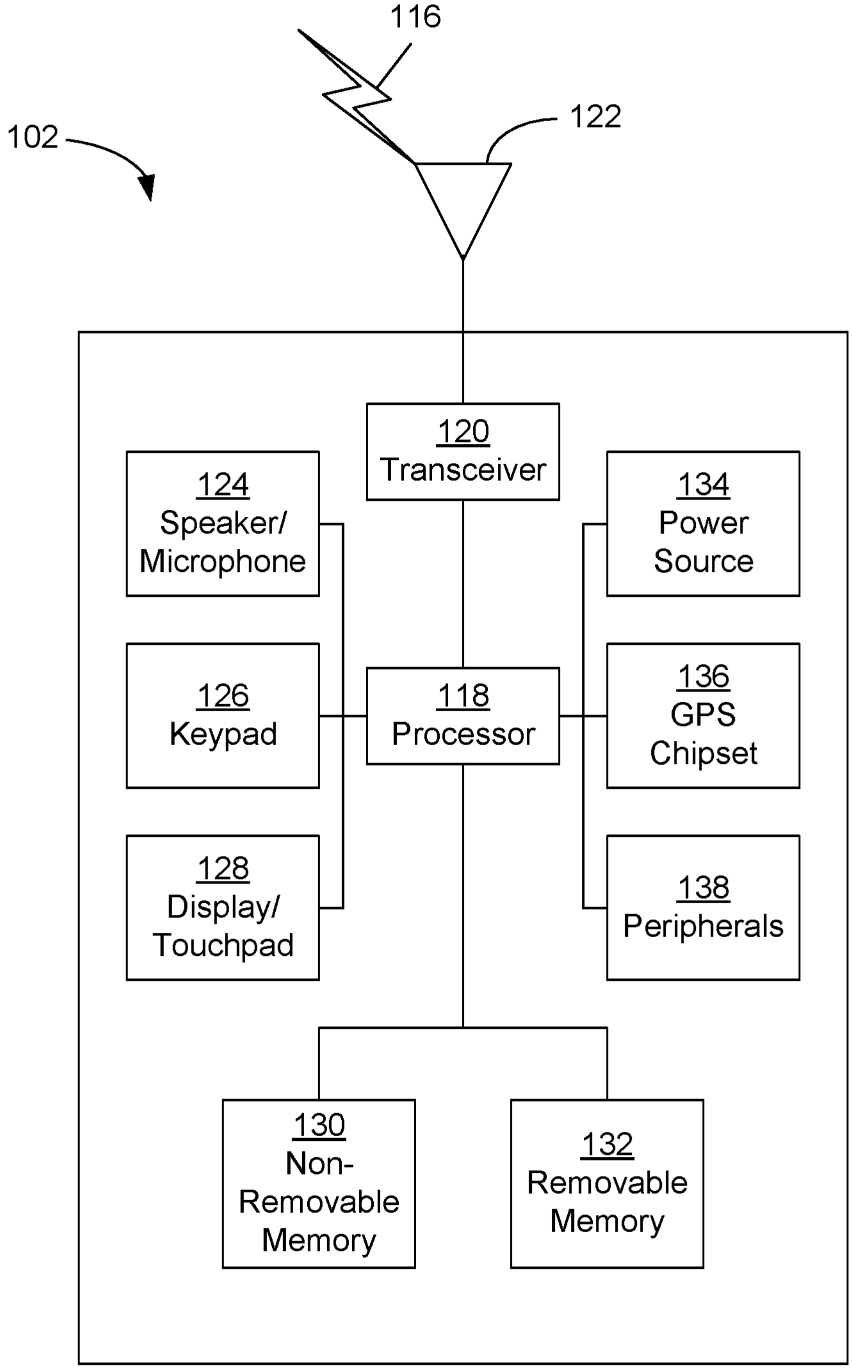
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
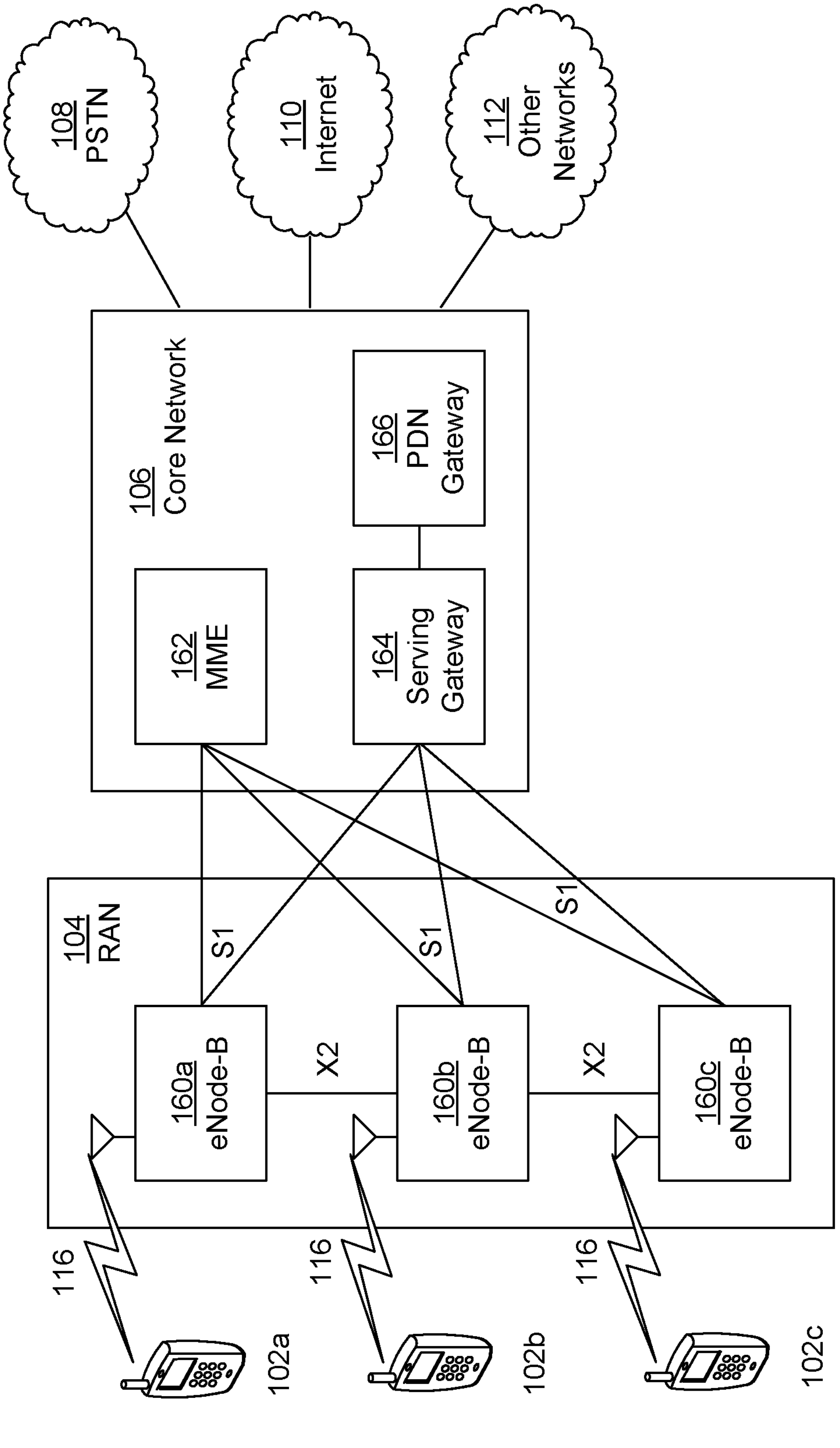
FIG. 1D is a system diagram illustrating a further example RAN and a further example CN that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
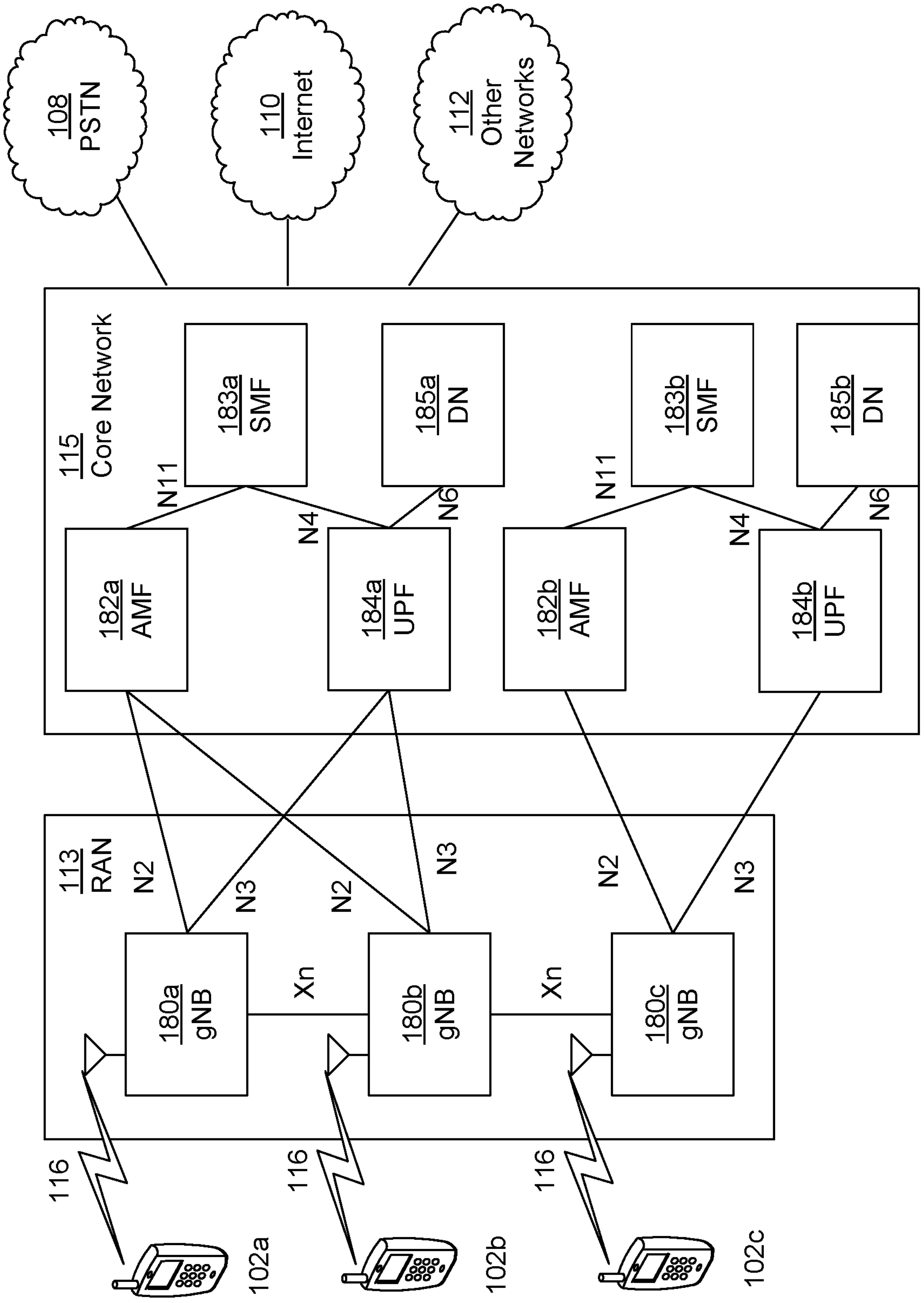

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement M IMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (His) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A sidelink transmission span (e.g., each sidelink transmission span) within one slot may include one or more of PSSCH and/or PSCCH transmission(s). For example, PSSCH and/or PSCCH may be FDM and/or TDM multiplexing. Sidelink control information (SCI) may be divided into parts. For example SCI may be divided into two parts. The two parts may include first stage SCI and second stage SCI. The first stage SCIs may indicate one or more of resources used for sidelink transmission, the QoS of the transmission (e.g., priority), DMRS, PTRS used for the sidelink transmission, and/or the second SCI format. The second stage SCI may indicate the remaining control information. For example, SCI may be used to reserve the resource for future transmission within a resource pool.

The WTRU may be configured for sidelink transmission scheduling. The sidelink resource may be scheduled by the network (e.g., Mode 1) and/or autonomously selected by the WTRU (e.g., Mode 2). The WTRU may perform sensing by decoding SCI from other WTRUs, for example if the WTRU performs Mode 2. Additionally, or alternatively, the WTRU may select one or more sidelink resources (e.g., to avoid selecting the resources reserved by other WTRUs), for example after performing sensing by decoding SCI from other WTRUs. Systems and methods described herein may describe how the WTRU performs sensing and/or performs resource selection for sidelink data communication, for example for WTRU-autonomous resource allocation (i.e., Mode 2). The WTRU may be configured with a resource pool for sensing and/or resource allocation. The WTRU may perform sensing during the sensing window, for example to detect transmissions and/or resource reservations from one or more other WTRUs (e.g., via SCI decoding). The WTRU may trigger resource selection to select the resource for transmission, for example upon data arrival. The WTRU may select a resource selection window (RSW). The RSW may be selected as a function of packet delay budget (PDB). The WTRU may (e.g., first) determine which resources are reserved by one or more other WTRUs and/or exclude the resources from the set of selectable resources, for example in the RSW. The WTRU may (e.g., then) select the resource for transmission in the RSW. The resource may be selected from a set of selectable resources. For example, the WTRU may select the resource for periodic and/or aperiodic transmission.

SL-CSI-RS may be supported for unicast. SL-CSI-RS may support the Tx WTRU for determination of Tx parameters (e.g., power and rank). Tx WTRU may indicate the presence of SL-CSI-RS, for example by using SCI. A CSI-RS transmission may trigger CSI reporting. For example, CSI reporting latency may be configured via PC5 RRC. A (e.g., each) reporting may associated with one SL-CSI-RS transmission.

NR Uu positioning may be one or more of DL-based, UL-based, and/or DL and UL-based. One or more DL-PRS may be sent from one or more TRPs to one or more WTRU, for example in DL-based systems and methods. A WTRU may observe measurement of download signals. A WTRU may determine one or more positions of one or more WTRUs. The WTRU may send (e.g., return) one or more downlink measurements to one or more networks. The positioning method and system may be angle-based. For example, the WTRU may report one or more angle of arrival (AoA). Additionally, or alternatively, the WTRU may report one or more RSRP of one or more signals. The one or more signals may include downlink signals. The one or more signals may be from one or more TRPs. Positioning may be timing-based. For example, the WTRU may report one or more RSTD. There may be transmission timing synchronization among one or more TRPs. There may be positioning calculation errors. Positioning calculation errors may at least partially be based on one or more of synchronization error and/or multipath.

Positioning may be UL-based. The WTRU may send one or more UL-PRS. The one or more UL-PRS may be for positioning. The one or more UL-PRS may be configured by RRC. The one or more UL-PRS may be sent to one or more TRPs. A network or networks may determine or calculate one or more positions of one or more WTRUs. For example, the determination or calculation may be based on coordination of one or more TRPs.

Positioning may be DL and/or UL-based. A WTRU may measure one or more Rx-Tx time differences. The one or more time differences may be between one or more received DL-PRSs and/or transmitted UL-PRSs. The one or more Rx-Tx time differences may be reported to a network or networks. For example, the network or networks may coordinate the one or more TRPs. The cooridination may be to determine or calculate a position or positions of one or more WTRUs.

Figure 2:
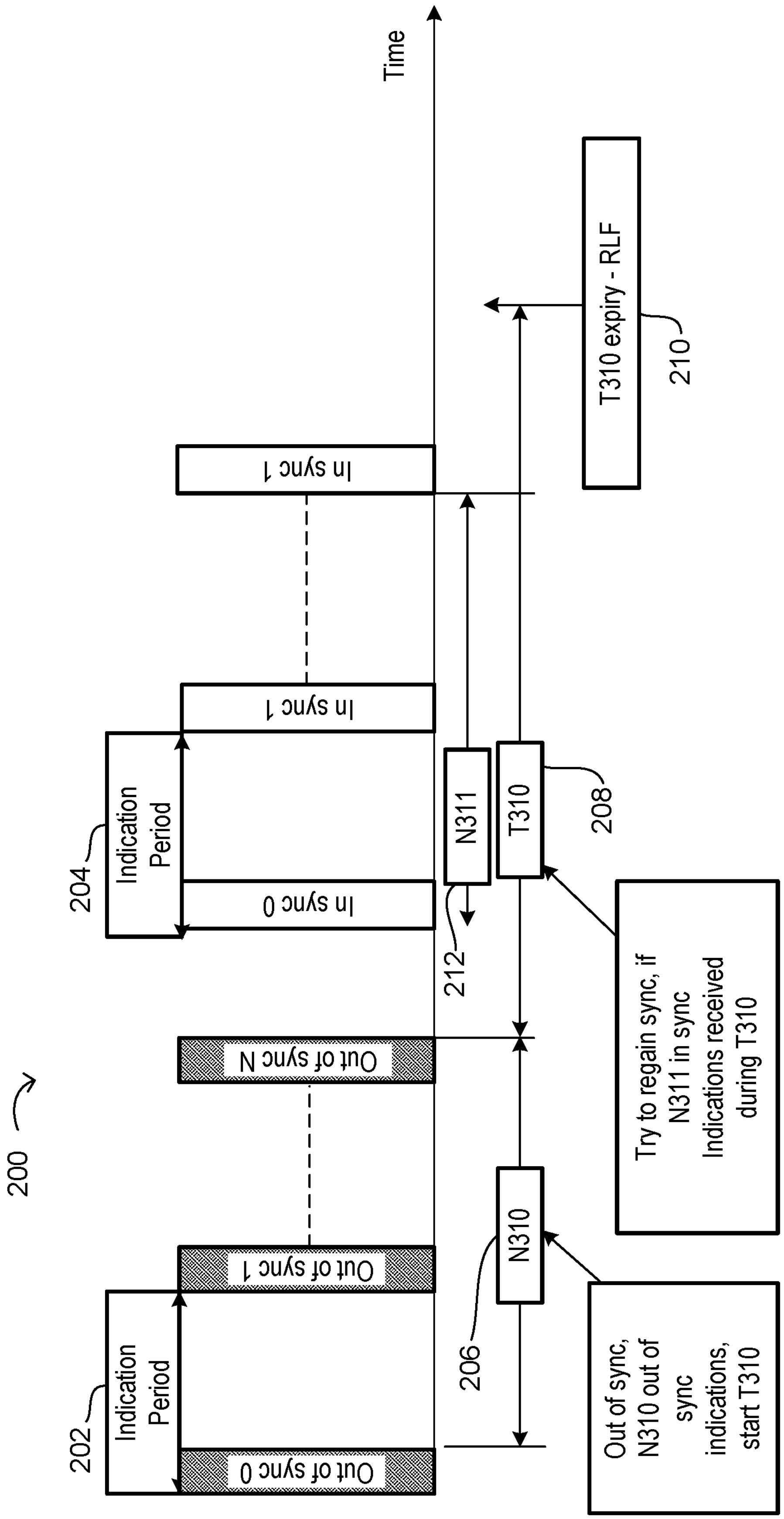
FIG. 2 is an example diagram illustrating radio link monitoring (RLM) and radio link failure (RLF) procedure.

FIG. 2 is an example diagram illustrating an radio link monitoring (RLM) and radio link failure (RLF) procedure 200. For example, a radio link monitoring (RLM) and radio link failure (RLF) procedure may be over the Uu interface. RLM/RLF may be supported. RLM/RLF may monitor one or more Uu links. The one or more Uu links may be between one or more WTRUs and one or more gNBs. A WTRU may be configured from a network or networks. The configuration may use one or more of SSB and/or CSI-RS. The one or more of SSB and CSI-RS may monitor the one or more links. For example, a WTRU may be configured with one or more In Sync (IS)/Out of Sync (OOS) indication periods 202, 204. In the one or more indication periods 202, 204, a WTRU may monitor one or more signals. The one or more signals may be one or more configured radiolink monitoring reference signals (RM-RS). For example, the one or more RM-RSs may be one or more of SSB and/or CSI-RS.

The WTRU may monitor the one or more signals. The monitoring may determine (e.g., be used to determine) whether one of more WTRUs are at least one of IS and/or OOS. For example, the WTRU may determine whether one of more WTRUs are at least one of IS and/or OOS. A WTRU may be configured with one or more thresholds. The one or more thresholds may include one or more BLER thresholds. The one or more BLER thresholds may be one or more of Qin and/or Qout. The one or more thresholds may be used for determining IS/OOS. The WTRU may determine OOS, for example if a BLER of an RM-RS in an indication period is larger than Qout. As shown in FIG. 2, for example at 206, the WTRU may be configured N310 OOS. At 208, the WTRU may trigger at least one RLF timer T130. The trigger may be based on receipt N310 of one or more consecutive OOS indications. Additionally, or alternatively, the WTRU may declare RLF, for example after T310 expiration at 210 and/or if there is no N311 IS indication at 212.

A target WTRU may utilize one or more anchor WTRUs, for example in order to perform one or more of transmission/reception and measurement reporting. Additionally, or alternatively, the target WTRU may utilize one or more anchor WTRUs in sidelink positioning. Transmission and/or reception may include a SL-PRS. A measurement report may be for locating one or more positions of one or more WTRUs. One or more links between a target WTRU and one or more anchor WTRUs may change dynamically. A suitability of one or more anchor WTRUs to support locating the target WTRU may be (e.g., therefore) changed dynamically.

A QoS requirement of positioning may include one or more of positioning availability, latency, and/or accuracy. A target WTRU may regularly monitor one or more of a link condition and/or a link. The monitoring of one or more of a link condition and/or link quality may be between the target WTRU and one or more anchor WTRUs. The monitoring may be used to deal with dynamic conditions among WTRUs. The monitoring may help the WTRU to adapt one or more sidelink positioning procedures. The one or more sidelink positioning procedures may determine (e.g., guarantee) the QoS of a positioning service. For example, the QoS of the positioning service may be based on the one or more SL procedures. For example, the one or more procedures may perform one or more of minimizing the positioning interruption and/or improving positioning accuracy.

The suitability of one or more of a link, a WTRU, and/or a group for sidelink positioning may describe how suitable the one or more link, WTRU, and/or group is to support one or more WTRUs in a positioning method or system. A suitability of one or more of a link, a WTRU, and/or a group may be a (e.g., hard) value. For example, the (e.g., hard) value may be (e.g., either) suitable or unsuitable. In some embodiments the suitability of one or more of a link, a WTRU, and/or a group may be a soft value. For example, the soft value may be a value between suitable and unsuitable. The suitable/unsuitable (e.g., value) may include an indication of (e.g., refer to) whether one or more links are acceptable or unacceptable. The acceptability may be temporary and/or may be determined during at least one link evaluation period. Suitable/unsuitable (e.g., value) may include (e.g., refer to) at least one link being IS/OOS, for example during at least one link evaluation period. The terms message, signal, and sequence may be used interchangeably herein.

The term configured may mean that a WTRU is pre-configured and/or that a WTRU receives a configuration from at least one of a node, a WTRU (e.g., another WTRU), and/or a network. A configuration may be sent by at least one of SCI, MAC CE, RRC, PC5-RRC, Uu RRC, and/or SIB. A positioning group may include a plurality of WTRUs. For example, one WTRU may be a target WTRU, and at least one other WTRU may be an anchor WTRU. A forward link may be used to refer to the link/direction in which the quality is measured by the other WTRU, for example for unicast between two WTRUs. A reversed link may refer to the link/direction in which the quality is measured by a (e.g., the same) WTRU. A link may be used to refer to a WTRU associated with the link.

A WTRU may determine one or more positioning methods to use. The WTRU may determine a positioning method for one or more sidelink groups. For example, the WTRU may determine one or more positioning methods including SL-PRS transmission based-method, SL-PRS reception-based method, RTT-based method, SL-TDOA, SL-AoA, SL-AoD, Uu based, SL-based, and/or hybrid Uu and SL-based. The WTRU may determine a positioning method for one or more groups based on one or more of a configuration; an indication from one or more of a node, another WTRU, and a network; an indication from a gNB; an indication from a location management function (LMF); and/or a QoS of a service.

The WTRU may determine which of one or more WTRUs may perform link-based sidelink positioning monitoring. The WTRU may indicate (e.g., send an indication) to one or more WTRUs, the decision of which of one or more WTRUs to perform link-based sidelink positioning monitoring. For example, the WTRU may indicate to one or more nodes, WTRUs, and/or networks, information regarding whether one or more nodes, WTRUs, and networks, are to perform link-based sidelink monitoring. The WTRU may determine which WTRU is to perform link-based sidelink monitoring based on one or more of the target WTRU; the anchor WTRU; an indication from one or more node, WTRU, and/or network; one or more type of positioning indicator; one or more initiator of the positioning procedure, one or more positioning method; one or more WTRU that performs one or more of calculating a position and receiving one or more sidelink measurements; one or more receiver of one or more sidelink measurements; an output of a positioning procedure; and/or a type of WTRU. For example, a type of positioning indicator may include one of more of MO-LR, MT-LR, and/or NI-LR. An initiator of a positioning procedure may include one or more WTRU that transmits a sidelink positioning request, and/or one or more WTRU that performs link-based sidelink positioning monitoring. Positioning may include one or more of SL-PRS transmission based, SL-PRS reception-based, RTT-based, SL-TDOA, SL-AoA, SL-AoD, Uu based, SL-based, and/or hybrid Uu and SL-based. A positioning sever may include one or more of a WTRU that calculates the position and/or a WTRU that receives one or more sidelink measurements. An output of the positioning procedure may include one or more of an indication of whether the output of the positioning is absolute, a relative position, and/or a range.

The WTRU may determine whether or not to initiate a sidelink positioning monitoring procedure. For example, a WTRU may determine to initiate the sidelink positioning monitoring procedure. Additionally or alternatively, a WTRU may request that one or more WTRU initiate a sidelink positioning monitoring procedure. The WTRU may make this determination based on an indication that one or more of group and/or link monitoring for sidelink positioning may be utilize (e.g., is needed). The WTRU may decide whether or not to initiate a sidelink positioning monitoring procedure, for example based one or more of indication from one or more of a node, a WTRU, and a network; whether a positioning procedure is session-based on session-less-based; a duration of a session-based procedure; an output of a positioning procedure; and/or a QoS requirement of a positioning service. For example, an indication from one or more of a node, a WTRU, and a network may include a request that one or more of a link and/or group initiate sidelink positioning monitoring. Sidelink positioning monitoring may be utilized (e.g., needed) for a session-based positioning procedure. Sidelink positioning monitoring may not be utilized (e.g., needed), for example for a session-less-based procedure. For example, sidelink positioning monitoring may be utilized (e.g., needed) if the duration of the session is greater than a threshold. Sidelink positioning monitoring may not be utilized (e.g., needed) if the duration of the session is not greater than a threshold. Sidelink positioning monitoring may be utilized (e.g., needed) if the output of the positioning procedure is absolute. Sidelink positioning monitoring may not be utilized (e.g., needed) if the output of the positioning procedure is not absolute. The WTRU sidelink positioning monitoring may be utilized (e.g., needed), for example if the positioning availability requirement is higher than a threshold. WTRU sidelink positioning monitoring may not be utilized (e.g., needed), for example if the positioning availability requirement is not higher than a threshold.

The WTRU may determine suitability of a link for sidelink positioning based on received SL-PRS. In some embodiments, the WTRU may determine suitability of a link for sidelink positioning based on of reliability of a SL-PRS. The WTRU may determine that a link is not suitable, for example if the WTRU does not detect one or more expected SL-PRS transmissions. The one or more transmissions may be from a peer WTRU. The WTRU may determine the suitability of the link based on the quality of SL-PRS, for example if a WTRU detects one or more SL-PRS from one or more peer WTRUs. The WTRU may determine the link as suitable, for example if one or more measurement parameters of the SL-PRS satisfies a threshold. For example, the WTRU may consider the link as suitable if SL-RSRP is larger than a threshold. The WTRU may consider the link as unsuitable for sidelink positioning, for example if SL-RSRP is smaller than the threshold. The WTRU may consider the link as suitable if one or more line of sight/non-line of sight (LOS/NLOS) value is greater than a threshold. The WTRU may consider the link as unsuitable if one or more LOS/NLOS value is not greater than a threshold. The SL-RSRP threshold and/or LOS/NLOS threshold may be configured. The configuration may depend on one or more positioning method/procedure. The one or more positioning methods/procedures may include one or more of SL-PRS Tx-based, SL-PRS-Rx based, RTT-based, AoA, and/or SL-TDOA. Alternatively, or additionally, the one or more positioning methods/procedures may include one or more QoS requirements of a positioning service. A number of expected number of SL-PRSs in an evaluation period may be configured.

The WTRU may determine the suitability of a link for positioning based on one or more received sidelink transmissions. For example, the WTRU may receive one or more sidelink transmissions from one or more peer WTRU. The sidelink transmission may be one or more of data transmission and/or discovery transmission. The WTRU may determine the suitability of the link for sidelink positioning based on the availability of the expected sidelink transmission. The WTRU may determine the link as not suitable, for example if the WTRU does not detect one or more expected sidelink transmissions from the one or more peer WTRU. The WTRU may determine the suitability of the link based on the quality of the sidelink reception, for example if the WTRU detects one or more sidelink transmissions from one or more peer WTRU. The WTRU may determine the link as suitable, for example if one or more measurement parameters of the sidelink transmission satisfies a threshold. The WTRU may consider (e.g., determine) the link is suitable if one or more of RSRP measured in sidelink discovery reception (SD-RSRP) and/or sidelink data reception (SL-RSRP) is larger a threshold. The WTRU may (e.g., otherwise) consider the link as unsuitable for sidelink positioning. The threshold may be configured.

In some embodiments, the WTRU may report one or more sidelink measurements to one or more peer WTRU. For example, the WTRU may receive a sidelink transmission from one or more peer WTRU. The sidelink transmission may be one or more of a data transmission and/or a discovery transmission. The WTRU may (e.g., then) perform a measurement in one or more (e.g., different) types of transmission from the one or more peer WTRU. For example, the WTRU may (e.g., then) report one or more measurement parameters to another node (e.g., the Tx WTRU). The measurement parameters may include one or more of SL-RSRP measured on the associated PSCCH/PSSCH of the SL-PRS, SL-RSRP measured of the SL-PRS, SL-RSRP measured in sidelink transmission, SD-RSRP measured in the discovery transmission, LOS/N LOS value, ToA, Tx-Rx, AoA, and/or AoD.

The WTRU may determine the suitability of one or more links for sidelink positioning based on one or more measurement reporting. For example, the WTRU may receive one or more sidelink measurement reporting from one or more peer WTRUs. The WTRU may (e.g., then) determine the suitability of the link for sidelink positioning, for example based on the availability of the expected sidelink measurement reporting from the one or more peer WTRUs. The WTRU may consider the link as unsuitable, for example if the WTRU does not detect one or more expected sidelink measurement reporting (e.g., N) from the peer WTRU. The WTRU may determine the suitability of the link for sidelink positioning based on the measurement value of the parameters indicated in the sidelink measurement reporting, for example if the WTRU detects one or more expected sidelink measurement reporting. The WTRU may consider the link as suitable, for example if the value indicated in the sidelink measurement reporting is within a configured and/or predetermined range.

The configured and/or predetermined range may include one or more thresholds. The WTRU may assume one or more (e.g., other) of the one or more thresholds to be infinite or zero, for example if the configured and/or predetermined range includes one threshold. The configured and/or predetermined range may be based (e.g., dependent) on one or more a positioning method (e.g., SL-PRS Tx-based, SL-PRS-Rx based, RTT-based, AoA, SL-TDOA, etc.). Additionally, or alternatively, the configured and/or predetermined range may be based (e.g., dependent) on one or more the QoS requirements of the positioning service. The number of expected number of SL-PRSs (e.g., N) in an evaluation period may be configured. For example, the WTRU may receive the measurement reporting for transmitted SL-PRS from one or more peer WTRUs.

The WTRU may receive a SL-RSRP, for example measured in SL-PRS. The WTRU may consider the link as suitable for sidelink positioning, for example if the reported SL-RSRP is greater than one or more thresholds. The WTRU may consider the link as unsuitable for sidelink positioning, for example if SL-RSRP is smaller than the one or more threshold. The WTRU may receive one or more LOS/NLOS values, for example measured in SL-PRS. The WTRU may consider the link as suitable for sidelink positioning, for example if the reported SL-RSRP is greater than one or more thresholds. The WTRU may consider the link as unsuitable for sidelink positioning, for example if SL-RSRP is smaller than the one or more threshold.

The WTRU may evaluate one or more link by using one or more link quality metric. A link quality metric may be used to evaluate the quality (e.g., based on SL-RSRP, LOS/NLOS associated with the forward/reverse link) of a for sidelink positioning. For example, a link quality metric may include one or more of a received SL-PRS signal quality measured by the WTRU, a SL-PRS signal quality reported by peer WTRU, a discovery signal quality reported by peer WTRU, a sidelink data quality reported by peer WTRU, a sidelink data signal quality measured by the WTRU, a sidelink feedback signal quality for sidelink data (e.g., PSFCH) measured by the WTRU, a sidelink feedback signal quality for SL-PRS transmission measured by the WTRU, and a sidelink discovery signal quality measured by the WTRU. The WTRU may determine the link quality metric based on one or more of SL-PRS transmission and/or SL-PRS measurement reporting reception. The WTRU may determine one or more link quality metric based on SL-PRS reception. For example, the WTRU may determine one or more link quality metrics based on the SL-PRS signal quality reported by one or more peer WTRU. The WTRU may determine the link quality metric based on one or more of SL-PRS reception and/or the SL-PRS signal quality reported by one or more peer WTRUs.

The WTRU may determine which of one or more link quality metrics to use for link-based sidelink position monitoring. The WTRU may determine which of one or more link quality metrics to use for link-based sidelink positioning monitoring (e.g., to determine the suitability of the link for sidelink positioning) based on one or more positioning methods/procedures as herein. The WTRU may use the received SL-PRS signal quality as a link quality metric, for example for SL-PRS reception-based methods/procedures. For example, the WTRU may determine the suitability of the link for sidelink positioning based on the received SL-PRS.

The WTRU may use the SL-PRS measurement report as a link quality metric, for example for SL-PRS transmission-based methods/procedures. For example, the WTRU may determine the suitability of the link for sidelink positioning based on the SL-PRS measurement reporting from one or more peer WTRUs.

The WTRU may use both SL-PRS reception and SL-PRS measurement reporting to as a link quality metric, for example for RTT-based methods/procedures. For example, the WTRU may determine the suitability of the link for sidelink positioning based on both SL-PRS reception and the SL-PRS measurement reporting from the peer WTRU.

Additionally, or alternatively, the WTRU may determine which of one or more link quality metrics to use for link-based sidelink positioning monitoring (e.g., to determine the suitability of the link for sidelink positioning). The WTRU may determine which of one or more link quality metrics to use for link-based sidelink positioning monitoring based on the configured precedence of one or more different types of sidelink reception. For example, the WTRU may prioritize using SL-PRS reception (e.g., if it is available). The WTRU may prioritize using SL-PRS measurement reporting, for example if SL-PRS reception is not available. The WTRU may (e.g., otherwise) prioritize using data reception.

The WTRU may determine which of one or more link quality metrics to use for link-based sidelink positioning monitoring based on one or more of an availability and/or frequency of (e.g., different) types of sidelink reception (e.g., SL-PRS, sidelink data, feedback for SL-PRS, feedback for sidelink data, and/or discovery reception). The WTRU may prioritize SL-PRS reception to determine the usability of the link for sidelink positioning, for example if the WTRU periodically receives SL-PRS. The WTRU may prioritize using SL-PRS measurement reporting to determine the usability of the link for sidelink positioning, for example if the WTRU periodically receives SL-PRS measurement reporting.

The WTRU may use a set of sidelink reception (e.g., SL-PRS, sidelink data, and sidelink discovery reception) as a link quality metric, for example to determine the suitability of the link for sidelink positioning. For example, the WTRU may use a filtered RSRP of a set of sidelink reception from one or peer WTRU (e.g., SL-PRS, sidelink data, and sidelink discovery) to determine the suitability of one or more link for sidelink positioning. The WTRU may consider the link unsuitable, for example if the filtered RSRP is smaller than one or more thresholds. The WTRU may consider the link as suitable, for example if the filtered RSRP is larger than one or more thresholds.

The WTRU may determine when to evaluate the suitability of one or more links for sidelink positioning. The WTRU may determine when to evaluate the suitability of a link for sidelink positioning periodically. For example, the WTRU may be configured to evaluate the suitability of a link for sidelink positioning. The WTRU may (e.g., then) periodically evaluate the suitability of the link for sidelink positioning. A periodicity of the evaluation may be based on the periodicity of SL-PRS reception and/or SL-PRS measurement reporting.

The WTRU may determine when to evaluate the suitability of a link for sidelink positioning, for example based on the reception and/or the expected reception time of SL-PRS. The WTRU may evaluate the suitability of a link for sidelink positioning based on the time or expected time of SL-PRS reception, for example for SL-PRS Rx-based method.

The WTRU may determine when to evaluate the suitability of a link for sidelink positioning based on the reception and/or the expected reception time of SL-PRS measurement report by one or more peer WTRUs. The WTRU may evaluate the suitability of the link for sidelink positioning based on the reception and/or expected reception timing of SL-PRS measurement reporting from one or more peer WTRUs, for example for RTT-based positioning method and/or for SL-PRS transmission-based method.

The WTRU may determine when to evaluate the suitability of a link for sidelink positioning based on the reception and/or the expected reception time of discovery signal quality reported by peer WTRU. The WTRU may determine when to evaluate the suitability of a link for sidelink positioning based on the expected reception time of sidelink data quality reported by one or more peer WTRUs. The WTRU may determine when to evaluate the suitability of a link for sidelink positioning based on the expected reception time of sidelink data transmission by one or more peer WTRUs. The WTRU may determine when to evaluate the suitability of a link for sidelink positioning based on the expected reception time of sidelink discovery transmission by one or more peer WTRUs. The WTRU may determine when to evaluate the suitability of a link for sidelink positioning based on the expected reception time of sidelink feedback for sidelink data (e.g., PSFCH). The WTRU may determine when to evaluate the suitability of a link for sidelink positioning based on the expected reception time of sidelink feedback for SL-PRS transmission.

The WTRU may trigger sidelink transmission for sidelink positioning monitoring. The WTRU may request one or more peer WTRUs to perform sidelink transmission (e.g., SL-PRS, sidelink data, discovery, WTRU status report), for example to support sidelink positioning monitorning. The WTRU may request to report a status to support sidelink positioning monitoring.

The WTRU may determine one or more of Sidelink data and/or sidelink discovery transmission. The WTRU may transmit a WTRU status report. The status report may include a coverage status, for example including whether the WTRU is in network coverage or out of network coverage. The WTRU status report may include a resource allocation mode of the WTRU. The status report may include Uu conditions of the WTRU. The status report may include a RRC status. The RRC status may include whether the WTRU is in RRC CONNECTED and/or Idle/Inactive. The status may include a synchronization status (e.g., the quality of the sync source, the priority of the sync source, etc.). The status report may include positioning information of the WTRU. Positioning information may include one or more of an indication of positioning of the WTRU, the error bound for positioning position, the integrity of the position of the WTRU, the movement of the WTRU (e.g., speed), and/or etc. The WTRU may transmit a message (e.g., keep alive message), for example regularly to check the suitability of the link. The status report may include SL-PRS transmission.

One or more of the transmissions to support sidelink positioning monitoring may be based on a configured periodic transmission. The WTRU may (e.g., periodically) request one or more peer WTRUs to perform sidelink transmission. For example, the WTRU may (e.g., periodically) request the one or more peer WTRUs to report a status. The WTRU may (e.g., periodically) perform sidelink transmission (e.g., SL-PRS, discovery, and/or sidelink data transmission), for example to support sidelink positioning monitoring. The number of sidelink transmissions/receptions in an evaluation period may smaller than one or more configured thresholds. The number of sidelink transmissions/receptions in an evaluation period may greater than or equal to one or more configured thresholds.

The WTRU may determine the link as unsuitable for one or more of a configured duration and/or a configured number of evaluation events. The WTRU may trigger sending SL-PRS, for example if the WTRU determines the link as unsuitable. The WTRU may (e.g., expect to) receive SL-PRS measurement report from one or more peer WTRUs. The WTRU may (e.g., further) evaluate the link for sidelink positioning. The WTRU may not receive a configured minimum number of transmissions used for evaluating the suitability of the link for a configured duration (e.g., SL-PRS transmission)

The WTRU may determine whether to formulate one or more positioning groups. For example, the WTRU may one or more of formulate and/or form one or more positioning groups. The WTRU may determine to establish a group connection for sidelink positioning. The WTRU may receive (e.g., from the network) and/or create a group specific ID (e.g., destination ID), for example to communicate among one or more WTRUs in the positioning group. The WTRU may determine whether to one or more of form and/or formulate one or more positioning groups based on one or more indications from another node. For example, the WTRU may receive an indication from a gNB (e.g., LMF) to formulate one or more positioning groups. The WTRU may determine whether to one or more of form and/or formulate one or more positioning groups based on one or more positioning methods/procedures. The WTRU may form one or more positioning group, for example for SL-TDOA. The WTRU may (e.g., otherwise) not form a positioning group, for example for m-RTT. The WTRU may determine whether to one or more of form and/or formulate one or more positioning groups based on a (e.g., intended) positioning outcome of the positioning method/procedure. The WTRU may form a sidelink positioning group (e.g., of one or more WTRUs), for example if the outcome of the positioning is absolute. The WTRU may (e.g., otherwise) not form a positioning group, for example if the outcome of the positioning is one or more of relative and range.

The WTRU may determine which WTRU, which may for example include the WTRU itself, will perform group-based sidelink position monitoring. The WTRU may (e.g., then) indicate to one or more different WTRUs a decision. For example, the WTRU may indicate to one or more other nodes (e.g., other WTRU or gNB) whether the WTRU and/or another WTRU (e.g., the WTRU may include the WTRU ID) may perform group-based sidelink positioning monitoring. The WTRU may determine which WTRU, which may include the WTRU itself, will perform group-based sidelink position monitoring based on the target WTRU. The target WTRU may perform group-based sidelink positioning monitoring, for example if the WTRU forms a group of anchor WTRUs to determine a position. The WTRU may determine which WTRU, which may include the WTRU itself, to perform group-based sidelink position monitoring based on one or more anchor WTRUs. The one or more anchor WTRUs may perform group-based sidelink positioning monitoring, for example if a WTRU initiates the positioning group (e.g., for NI-LR or MT-LR) to support one or more target WTRUs. The WTRU may determine which WTRU, which may include the WTRU itself, to perform group-based sidelink position monitoring based on indication from one or more other nodes (e.g., one or more other WTRU or gNB). For example, the WTRU may receive an indication (e.g., be indicated) from one or more other nodes (e.g., gNB) to perform group-based sidelink positioning monitoring.

The WTRU may (e.g., then) determine whether to perform the monitoring and/or may (e.g., then) send feedback to one or more requesting nodes (e.g., gNB) of such decision (e.g., the WTRU may give feedback to the one or more requesting node of whether the one or more node performs sidelink positioning monitoring). The WTRU may determine which WTRU, which may include the WTRU itself, will perform group-based sidelink position monitoring based on the type of positioning initiator (e.g., whether the positioning initiator is MO-LR, MT-LR, NI-LR). The target WTRU may perform group-based sidelink positioning monitoring, for example for MO-LR. One or more anchor WTRU may perform group-based sidelink positioning monitoring, for example for MT-LR. The WTRU may determine which WTRU, which may include the WTRU itself, will perform group-based sidelink position monitoring based on the initiator of the positioning procedure. The WTRU may perform group-based sidelink positioning monitoring, for example if the WTRU transmits sidelink positioning request. The WTRU may perform group-based sidelink positioning monitoring, for example if the WTRU transmits discovery for sidelink positioning. The WTRU may determine which WTRU, which may include the WTRU itself, will perform group-based sidelink position monitoring based on a positioning method/procedure (e.g., SL-PRS transmission-based, SL-PRS reception-based, RTT-based, SL-TDOA, SL-AoA, SL-AoD, and/or hybrid Uu and SL-based). One or more WTRUs may each perform group-based sidelink positioning monitoring, for example for RTT-based method.

Additionally, or alternatively, a receiver WTRU of the measurement report may perform group-based sidelink positioning monitoring. The target WTRU may perform group-based sidelink positioning monitoring, for example for SL-TDOA. One or more anchor WTRUs may perform group-based sidelink positioning monitoring, for example for SL-PRS transmission-based method. The WTRU may determine which WTRU, which may include the WTRU itself, will perform group-based sidelink position monitoring based on the positioning server WTRU (e.g., the WTRU calculating one or more of a position and one or more receiving sidelink measurement reports). The WTRU may determine which WTRU, which may include the WTRU itself, will perform group-based sidelink position monitoring based on the receiver of the sidelink measurement report. The WTRU may determine which WTRU, which may include the WTRU itself, will perform group-based sidelink position monitoring based on the output of the positioning procedure (e.g., whether the output of the positioning is absolute, relative position, and/or range). One or more WTRUs may perform group-based sidelink positioning monitoring, for example for relative positioning. The target WTRU may perform group-based sidelink positioning monitoring, for example for absolute positioning. The WTRU may determine which WTRU, which may include the WTRU itself, will perform group-based sidelink position monitoring based on a type of WTRU. For example, an RSU may perform link-based sidelink monitoring.

The WTRU may determine whether to monitor one or more of a link and/or a WTRU in a group. The WTRU may determine whether to monitor one or more of a link and/or a WTRU in a group, for example based on the positioning accuracy of the WTRU. The WTRU may monitor the WTRU (e.g., a WTRU in the group), for example if the positioning accuracy of the WTRU is greater than one or more configured threshold. The WTRU may (e.g., otherwise) not monitor the WTRU. The WTRU may determine whether to monitor one or more of a link and/or a WTRU in a group based on the synchronization accuracy of the WTRU. The WTRU may monitor a WTRU (e.g., a WTRU in the group), for example if the positioning accuracy of the WTRU and/or the synchronization priority of the WTRU is greater than one or more configured thresholds. The WTRU may monitor the WTRU (e.g., a WTRU in the group), for example if the WTRU uses the same synchronization source. For example, the WTRU may (e.g., otherwise) not monitor the WTRU (e.g., a WTRU in the group). The WTRU may determine whether to monitor one or more of a link and/or a WTRU in a group based on the relative distance to the WTRU. The WTRU may monitor the WTRU (e.g., a WTRU in the group), for example if the relative distance to the WTRU is within a configured and/or predetermined range. For example, the WTRU may (e.g., otherwise) not monitor the WTRU (e.g., a WTRU in the group). The WTRU may determine whether to monitor one or more of a link and/or a WTRU in a group based on the link quality between one or more WTRUs. The WTRU may monitor the WTRU (e.g., a WTRU in the group), for example if one or more of SL-RSRP and/or LOS/NLOS of the link to the WTRU is greater than one or more configured thresholds. For example, the WTRU may (e.g., otherwise) not monitor the WTRU (e.g., a WTRU in the group).

The WTRU may determine a set of one or more of links and/or WTRUs to monitor in a group. For example, the WTRU may be configured to monitor a minimum number of links (e.g., N) for group-based sidelink positioning monitoring. The WTRU may (e.g., then) determine to monitor at least N links. The set of one or more of links and/or WTRUs to monitor may be (e.g., then) determined, for example based on other factors. Other factors may include one or more of positioning accuracy, synchronization accuracy, distance, link quality, and/or etc. of one or more WTRUs in the group.

The WTRU may determine whether the positioning group is one or more of suitable and/or unsuitable for sidelink positioning. The WTRU may determine whether the positioning group is one or more of suitable and/or unsuitable (e.g., Group-suitable/Group-unsuitable) for sidelink positioning, for example in an evaluation period. The WTRU may determine whether the positioning group is suitable based on the number of suitable one or more of links and/or WTRUs in the group in the evaluation period. For example, the WTRU may be configured with a minimum number of suitable one or more of links and WTRUs (e.g., N) to determine whether the positioning group is one or more of suitable and/or unsuitable. The WTRU may determine the positioning group as suitable (e.g., Group-suitable) if there are at least N suitable links and/or WTRUs in the group. The WTRU may (e.g., otherwise) determine the positioning group as unsuitable (e.g., Group-unsuitable), for example if there are less than N suitable one or more of links and WTRUs.

The WTRU may determine when to evaluate the suitability of a positioning group for sidelink positioning. For example, the WTRU may determine when to evaluate the suitability of a positioning group for sidelink positioning based on periodicity. The WTRU may be configured to evaluate the suitability of a positioning group for sidelink positioning. The WTRU may (e.g., then) periodically evaluate the suitability of the link for sidelink positioning. For example, the periodicity of the evaluation may be based on the periodicity of one or more of SL-PRS reception and/or SL-PRS measurement reporting.

The WTRU may determine when to evaluate the suitability of a positioning group for sidelink positioning based on the reception and/or the expected reception time of a configured minimum number of SL-PRS from the group. For example for SL-PRS Rx-based method, the WTRU may evaluate the suitability of a group for sidelink positioning based on the time and/or expected reception time of a configured minimum number of SL-PRSs from the group. The WTRU may determine when to evaluate the suitability of a positioning group for sidelink positioning based on one or more of the reception and/or the expected reception time of a configured minimum number SL-PRS measurement reports by member WTRUs.

The WTRU may evaluate the suitability of the group for sidelink positioning based on the reception or expected reception timing of a configured minimum number SL-PRS measurement reporting from member WTRUs, for example for RTT-based positioning method and/or for SL-PRS transmission-based methods/procedures. The WTRU may determine when to evaluate the suitability of a positioning group for sidelink positioning based on one or more of the reception and/or the expected reception time of a configured minimum number discovery signal quality reported by WTRU in the group. The WTRU may determine when to evaluate the suitability of a positioning group for sidelink positioning based on one or more of the reception and/or the expected reception time of a configured minimum number sidelink data quality reported by member WTRUs.

The WTRU may determine when to evaluate the suitability of a positioning group for sidelink positioning based on one or more of the reception and/or the expected reception time of a configured minimum number sidelink data transmission by member WTRUs. The WTRU may determine when to evaluate the suitability of a positioning group for sidelink positioning based on one or more of the reception and/or the expected reception time of a configured minimum number sidelink discovery transmission by member WTRUs. The WTRU may determine when to evaluate the suitability of a positioning group for sidelink positioning based on one or more of the reception and/or the expected reception time of a configured minimum number sidelink feedback for sidelink data (e.g., PSFCH) from member WTRUs. The WTRU may determine when to evaluate the suitability of a positioning group for sidelink positioning based on one or more of the reception and/or the expected reception time of a configured minimum number sidelink feedback for SL-PRS transmission from member WTRUs.

The WTRU may determine whether another WTRU is moving out of the group, for example based on a sidelink condition between the other WTRU and the WTRU. The sidelink condition between the WTRUs may be determined based on the distance and/or the direction between the WTRUs. For example, the WTRU may determine that another WTRU is moving out of the group if the distance between the WTRUs is greater than a (e.g., configured and/or predetermined) threshold. The WTRU may (e.g., otherwise) determine that the other WTRU is still in the group. The sidelink condition between the two WTRUs may be determined based on a channel condition between the WTRUs. The sidelink condition between the WTRUs may be determined based on a measurement of one or more transmissions between the WTRUs. The measurement may include one or more of an SL-RSRP, an SL-RSSI, and/or an LOS/N LOS measurement. The transmission between the WTRUs may include one or more of an SL-PRS transmission, a sidelink data transmission, and/or a sidelink control transmission. For example, if the measured SL-RSRP of the transmission(s) between WTRUs is less than a (e.g., configured and/or predetermined) threshold, the WTRU may determine that the other WTRU is moving out of the group. The WTRU may determine that the other WTRU is still in the group if the measured SL-RSRP of the transmissions between the WTRUs is greater than a (e.g., configured and/or predetermined) threshold.

The WTRU may determine whether to maintain or terminate a sidelink positioning group and/or the sidelink positioning session, for example based on one or more WTRUs moving out of the group. The WTRU may determine to maintain the group and/or the sidelink positioning session, for example if a number of the WTRUs moving out of the group is less than a (e.g., configured and/or predetermined) threshold. The WTRU may (e.g., otherwise) determine to terminate the group and/or the sidelink positioning session, for example if a number of WTRUs moving out of the group is greater than a (e.g., configured and/or predetermined) threshold. Additionally, or alternatively, the WTRU may determine to maintain the group and/or the sidelink positioning session if a number of remaining WTRUs in the group is greater than a (e.g., configured and/or predetermined) threshold. Additionally, or alternatively, the WTRU may (e.g., otherwise) determine to terminate the group and/or the sidelink positioning session if a number of remaining WTRUs in the group is less than a configured threshold. The WTRU may send an indication to another node, for example when one or more WTRUs move/are moving out of the group. The other node may include one or more of a gNB, a LMF, and/or one or more other WTRUs (e.g., anchor WTRU(s)), for example. The WTRU may send an indication to the other node to terminate the positioning group and/or the sidelink positioning session. Additionally, or alternatively, the WTRU may send an indication to the other node to maintain the positioning group and/or the sidelink positioning session.

The WTRU may send an indication to one or more other nodes to terminate the positioning group and/or the positioning session. For example, the WTRU may send the indication to the network (e.g., LMF) to terminate the positioning group and/or the sidelink positioning session. The WTRU may send a request for the termination of the positioning group and/or positioning session. Additionally, or alternatively, the WTRU may send an indication to one or more other WTRUs (e.g., anchor WTRU(s)) to terminate the positioning group and/or positioning session.

The WTRU may send an indication to one or more other nodes to maintain the positioning group and/or the positioning session. For example, the WTRU may send an indication to the network (e.g., LMF) to update the set of WTRUs in the group. The WTRU may request a new configuration of SL-PRS transmission for the group. Additionally, or alternatively, the WTRU may send an indication to one or more other WTRUs to maintain the positioning group and/or the sidelink positioning session. The WTRU may send an update for the positioning group, which, for example, made include a (e.g., new) set of the WTRUs and/or SL-PRS transmission resources for the group.

The WTRU may declare link-persistently unusable for sidelink positioning (LPUSP). Additionally, or alternatively, WTRU may trigger a LPUSP timer. The WTRU may evaluate one or more links to determine the suitability of the one or more links for sidelink positioning. For example, the WTRU may make this evaluation at the same time and/or after triggering the LPSUP timer. The WTRU may declare one or more links as LPUSP, for example if a number of one or more suitability indications is less than one or more thresholds. For example, the WTRU may declare the link as LPSUP upon expiry of the LPUSP timer.

The WTRU may declare group-persistently unusable for sidelink positioning (GPUSP). Additionally, or alternatively, the WTRU may trigger a GPUSP timer. In some embodiments, the WTRU may evaluate one or more links to determine the suitability of the one or more links for sidelink positioning. For example, the WTRU may make this evaluation at the same time and/or after triggering the GPSUP timer. The WTRU may declare one or more links as GPUSP, for example if a number of one or more suitability indications is less than one or more thresholds. For example, the WTRU may declare the link as GPSUP upon expiry of the GPUSP timer.

The WTRU may determine whether to declare one or more of LPSUP and/or GPSUP. For example, the WTRU may determine whether to declare one or more of LPSUP and/or GPSUP based on whether the WTRU determines one or more of a link and/or group as unsuitable for one or more of a configured duration, a number of evaluation periods, and/or number of indications. The WTRU may determine whether to declare one or more of LPSUP and/or GPSUP based on reception of one or more of LPUSP and/or GPUSP from one or more other nodes (e.g., from one or more other WTRU and/or gNB).

The WTRU may perform one or more methods/procedures as herein at the same time and/or after determining the one or more of a link and a group as unsuitable for sidelink positioning. Additionally, or alternatively, the WTRU may perform one or more of the following at the same time and/or after declaration of LPUSP and/or GPUSP. The WTRU may send an indication (e.g., one or more of LPUSP, GPUSP, and link/group suitability indication) to one or more other nodes (e.g., the network or the peer WTRU). The WTRU may request that one or more other WTRUs stop sidelink transmission (e.g., SL-PRS, sidelink data, sidelink discovery, sidelink feedback, etc.) for sidelink positioning monitoring. The WTRU may release a link. The WTRU may stop one or more sidelink positioning session. The WTRU may remove one or more link from one or more sidelink positioning group. The WTRU may release one or more groups. The WTRU may stop one or more sidelink positioning sessions. The WTRU may perform one or more positioning request transmissions. The WTRU may add one or more WTRUs to the group. The WTRU may trigger one or more positioning request transmissions to ask for support from more WTRUs. The WTRU may change one or more positioning methods/procedures. The WTRU may change from one positioning method/procedure to another positioning method/procedure, for example if the WTRU declares GPUSP for the positioning group.

The WTRU may receive one or more indications from one or more other nodes for sidelink positioning monitoring. The WTRU may receive one or more of LPUSP and/or GPUSP. The WTRU may receive information that the WTRU is releasing the link. The WTRU may receive information that one or more WTRUs may leave the sidelink positioning group. The WTRU may receive information that one WTRUs change from in coverage to out of coverage. The WTRU may receive information that one or more WTRUs change from out of coverage to in coverage. The WTRU may receive information that one or more WTRUs changes resource allocation mode for sidelink positioning. The WTRU may receive information that one or more WTRUs may experience Uu RLF. The WTRU may receive information that one or more WTRUs change the RRC state. The WTRU may receive information that one or more WTRUs handover to another cell.

Additionally, or alternatively, the WTRU may, for example upon reception of one or more indications, pause the positioning procedure/session. For example, the WTRU may indicate to one or more other WTRU to pause one or more positioning procedures/sessions. Additionally, or alternatively, the WTRU may pause sending one or more of SL-PRS and/or a measurement report. The WTRU may, for example upon reception of one or more indications, stop the positioning session. The WTRU may, for example upon reception of one or more indications, release one or more links. The WTRU may, for example upon reception of one or more indications, release one or more positioning groups. The WTRU may, for example upon reception of one or more indications, change one or more resource allocation mode (e.g., from Mode 1 to Mode 2). The WTRU may, for example upon reception of one or more indications, change one or more positioning methods. The WTRU may, for example upon reception of one or more indications, release one or more links and trigger one or more sidelink positioning discovery procedures. The one or more sidelink positioning discovery procedures may find one or more anchor WTRUs.

The WTRU may establish a group for sidelink positioning. The WTRU may establish one or more group connections. For example, the one or more group connections may be for a group of WTRUs. Additionally, or alternatively, the one or more group connections may support sidelink positioning. The WTRU may be assigned (e.g., by LMF) to communicate with one or more WTRUs in the group. Alternatively, or additionally, the WTRU may use one group ID (e.g., Destination ID) to communicate with one or more WTRUs in the group.

The WTRU may select one or more WTRUs for one or more positioning sessions. The WTRU may initiate a positioning session. For example, the WTRU may (e.g., then) select a set of one or more WTRUs in a positioning group to support the WTRU positioning. The WTRU may transmit one or more positioning request messages, for example to request support from one or more anchor WTRUs. The one or more positioning request messages may include one or more group IDs, for example from one or more previously established group. The WTRU to select one or more anchor WTRUs from a set of one or more trusted WTRUs, for example using one or more methods/procedures as herein. Additionally, or alternatively, the WTRU may (e.g., then) release the WTRUs (e.g., by sending a release message) when the positioning session ends.

Figure 3:
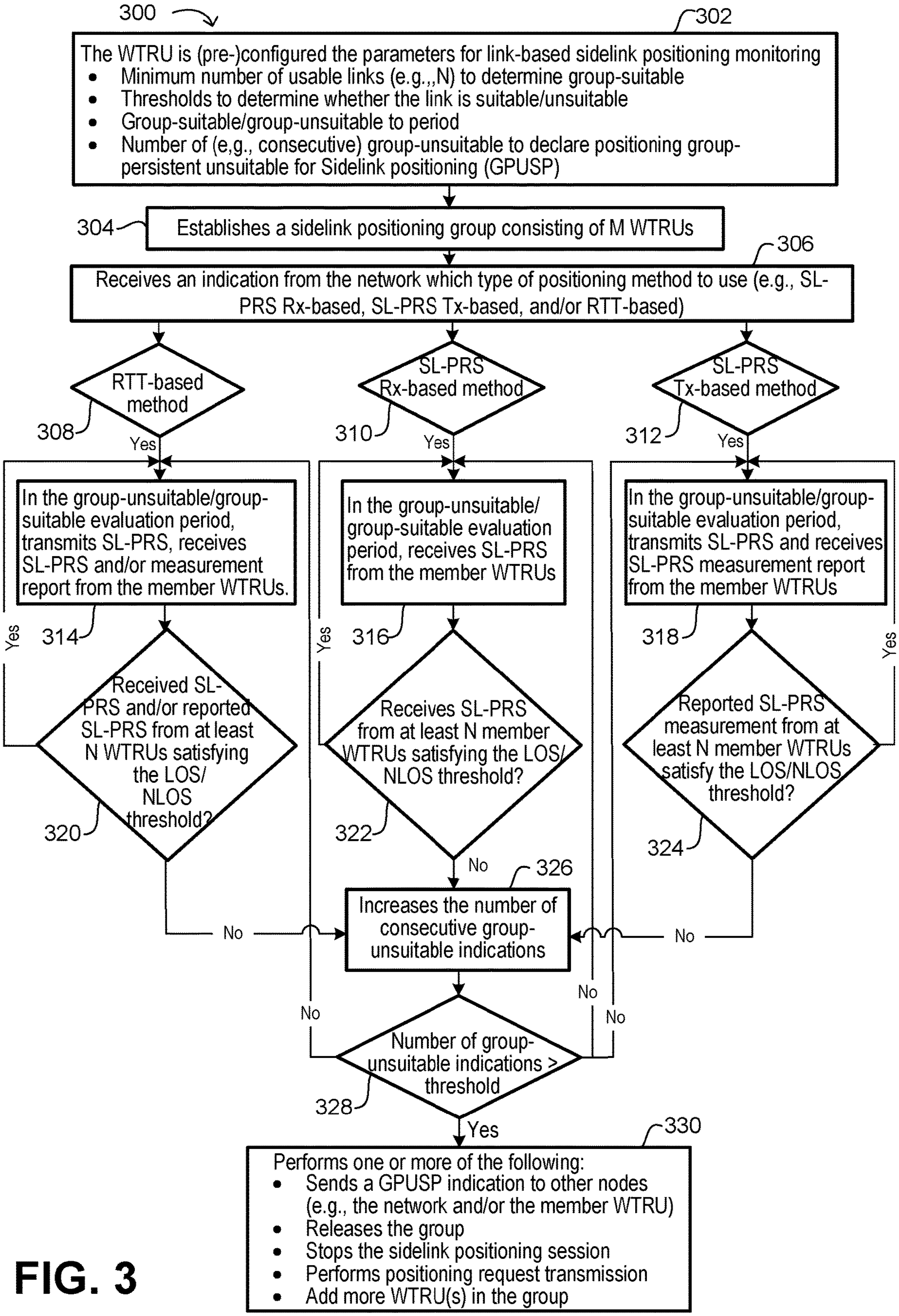
FIG. 3 illustrates a flowchart of an example procedure for group-based sidelink positioning monitoring.

The WTRU may perform link-based sidelink positioning monitoring. FIG. 3 illustrates a flowchart of an example procedure 300 for group-based sidelink positioning monitoring. At 302 the WTRU may be configured and/or pre-configured with one or more of the parameters for group-based sidelink positioning monitoring. The one or more parameters for group-based sidelink positioning monitoring may include one or more of the minimum number of suitable links (i.e., N) to determine group-suitable, one or more threshold to determine whether a link is suitable/unsuitable, one or more group-suitable/group-unsuitable evaluation period, and/or one or more number of (e.g., consecutive) group-unsuitable indications to declare the group as GPUSP. At 304 the WTRU may establish one or more sidelink positioning group. A sidelink positioning group may include M member WTRUs (e.g., anchor WTRUs). At 306 the WTRU may receive an indication from one or more networks regarding which type of positioning method to use (e.g., SL-PRS Rx-based, SL-PRS Tx-based, and/or m-RTT-based). The WTRU may (e.g., first) transmit SL-PRS to one or more member WTRUs, for example for RTT-based and/or for one or more of each period. The WTRU may (e.g., then) receive SL-PRS and/or SL-PRS measurement reporting from each one or more member WTRU in one or more groups. At 314 the WTRU may perform one or more of transmitting SL-PRS, receiving SL-PRS, and/or receiving an SL-PRS measurement report from the member WTRU (s), for example for one or more group suitable/unsuitable evaluation periods. At 316 the WTRU may receive SL-PRS from the member WTRU(s), for example for one or more group suitable/unsuitable evaluation periods. At 318 the WTRU may perform one or more of transmitting SL-PRS, receiving SL-PRS, and/or receiving an SL-PRS measurement report from the member WTRU(s), for example for one or more group suitable/unsuitable evaluation periods. The WTRU may (e.g., then) determine that (e.g., consider) one or more positioning group is group-suitable, for example if one or more of the quality of the received SL-PRS and/or the value of the reported SL-PRS measurement from at least N WTRUs satisfies one or more threshold (e.g., LOS/NLOS>Threshold). The WTRU may (e.g., otherwise) determine that (e.g., consider) the positioning as group-unsuitable in one or more periods.

The WTRU may (e.g., first) receive SL-PRS from each one or more member WTRU in the group, for example for SL-PRS Rx-based and/or for each one or more period. At 326 the WTRU may increase the number of consecutive indications (e.g., a counter). The WTRU may (e.g., then) determine that (e.g., consider) one or more positioning group is group-suitable, for example if the quality of the received SL-PRS from at least N member WTRUs satisfies one or more threshold at 328 (e.g., LOS/NLOS>Threshold). The WTRU may (e.g., otherwise) determine that (e.g., consider) the one or more groups is group-unsuitable in the one or more period.

The WTRU may transmit SL-PRS and/or receive SL-PRS measurement reporting from one or more member WTRUs, for example for SL-PRS Tx-based and/or for each period. The WTRU may determine that (e.g., consider) one or more positioning group as group-suitable, for example if the reported SL-PRS measurement from at least N member WTRUs satisfy one or more threshold (e.g., LOS/NLOS indicated in the SL-PRS measurement report>Threshold). The WTRU may determine that (e.g., consider) one or more groups is group-unsuitable in one or more period. The WTRU may use one or more established positioning group to determine/derive one or more position, for example if the number of (e.g., consecutive) group-unsuitable indications is less than one or more thresholds. At 330 the WTRU may perform one or more of sending a GPUSP indication to one or more other nodes (e.g., the network or the member WTRU), releasing one or more groups, stopping one or more sidelink positioning sessions, performing one or more positioning request transmission, and/or including one or more WTRUs in the group, for example if the number of (e.g., consecutive) group-unsuitable indications is greater than or equal to one or more thresholds.

What is claimed is:

1. A wireless transmit/receive unit (WTRU) comprising: memory; and a processor configured to:

establish a sidelink positioning group comprising a plurality of anchor WTRUs;

transmit a sidelink positioning reference signal (SL-PRS) to each anchor WTRU comprised in the sidelink positioning group;

receive a SL-PRS measurement report from each anchor WTRU comprised in the sidelink positioning group, the SL-PRS measurement report based on the SL-PRS transmitted to each anchor WTRU comprised in the sidelink positioning group, wherein the SL-PRS measurement report comprises an indication of one or more of a distance between the WTRU and the respective anchor WTRU or a direction between the WTRU and the respective anchor WTRU; and determine whether to maintain or terminate the sidelink positioning group if an anchor WTRU moves out of the sidelink positing group, wherein the processor is configured to determine that the anchor WTRU moves out of the sidelink positioning group based on one or more of the distance between the WTRU and the respective anchor WTRU or the direction between the WTRU and the respective anchor WTRU.

2. The WTRU of claim 1, wherein the processor is configured to:

determine whether each anchor WTRU comprised in the sidelink positioning group is suitable for sidelink group-based positioning based on a signal quality of the SL-PRS received from the respective anchor WTRU and the SL-PRS measurement report received from the respective anchor WTRU; and determine whether the sidelink positioning group is suitable for sidelink positioning based on whether a number of anchor WTRUs comprised in the sidelink positioning group that are suitable for sidelink positioning exceeds a threshold value.

3. The WTRU of claim 2, wherein the processor is configured to:

determine a position of the WTRU using the sidelink positioning group based on the number of anchor WTRUs of the sidelink positioning group that are suitable for sidelink positioning exceeding the threshold value.

4. The WTRU of claim 1, wherein the processor is configured to:

determine that the sidelink positioning group is unsuitable for group based positioning for a number of consecutive periods; and send a group persistently unusable for sidelink positioning (GPUSP) indication to one or more devices.

5. The WTRU of claim 4, wherein the GPUSP indication is sent to one or more of at least one anchor WTRU or a location management function (LMF).

6. The WTRU of claim 1, wherein a signal quality of the SL-PRS comprises one or more of a line of sight (LOS) value or a non-line of sight (NLOS) value.

7. The WTRU of claim 1, wherein the processor is configured to receive an indication to perform sidelink positioning monitoring.

8. The WTRU of claim 1, wherein the processor is configured to transmit an indication to terminate the sidelink positioning group.

9. The WTRU of claim 1, wherein the processor is configured to determine whether to maintain or terminate the sidelink positioning group based on a number of anchor WTRUs in the sidelink positioning group.

10. The WTRU of claim 1, wherein the processor is configured to determine to terminate the sidelink positioning group for every WTRU of the plurality of WTRUs of the sidelink positioning group based on an anchor WTRU moving out of the sidelink positioning group.

11. A method performed by a wireless transmit/receive unit (WTRU), the method comprising:

establishing a sidelink positioning group comprising a plurality of anchor WTRUs;

transmitting a sidelink positioning reference signal (SL-PRS) to each anchor WTRU comprised in the sidelink positioning group;

receiving a SL-PRS measurement report from each anchor WTRU comprised in the sidelink positioning group, the SL-PRS measurement report based on the SL-PRS transmitted to each anchor WTRU comprised in the sidelink positioning group, wherein the SL-PRS measurement report comprises an indication of one or more of a distance between the WTRU and the respective anchor WTRU or a direction between the WTRU and the respective anchor WTRU; and determining whether to maintain or terminate the sidelink positioning group if an anchor WTRU moves out of the sidelink positing group, wherein the method comprises determining that the anchor WTRU moves out of the sidelink positioning group based on one or more of the distance between the WTRU and the respective anchor WTRU or the direction between the WTRU and the respective anchor WTRU.

12. The method of claim 11, comprising:

determining whether each anchor WTRU comprised in the sidelink positioning group is suitable for sidelink group-based positioning based on a signal quality of the SL-PRS received from the respective anchor WTRU and the SL-PRS measurement report received from the respective anchor WTRU; and determining whether the sidelink positioning group is suitable for sidelink positioning based on whether a number of anchor WTRUs comprised in the sidelink positioning group that are suitable for sidelink positioning exceeds a threshold value.

13. The method of claim 12, comprising:

determining a position of the WTRU using the sidelink positioning group based on the number of anchor WTRUs of the sidelink positioning group that are suitable for sidelink positioning exceeding the threshold value.

14. The method of claim 11, comprising:

determining that the sidelink positioning group is unsuitable for group based positioning for a number of consecutive periods; and sending a group persistently unusable for sidelink positioning (GPUSP) indication to one or more devices.

15. The method of claim 14, wherein the GPUSP indication is sent to one or more of at least one anchor WTRU or a location management function (LMF).

16. The method of claim 11, wherein a signal quality of the SL-PRS comprises one or more of a line of sight (LOS) value or a non-line of sight (NLOS) value.

17. The method of claim 11, comprising receiving an indication to perform sidelink positioning monitoring.

18. The method of claim 11, comprising transmitting an indication to terminate the sidelink positioning group.

19. The method of claim 11, comprising determining whether to maintain or terminate the sidelink positioning group based on a number of anchor WTRUs in the sidelink positioning group.

20. The method of claim 11, comprising determining to terminate the sidelink positioning group for every WTRU of the plurality of WTRUs of the sidelink positioning group based on an anchor WTRU moving out of the sidelink positioning group.

* * * * *